(12) United States Patent
Roses et al.

(10) Patent No.: US 8,813,484 B2
(45) Date of Patent: Aug. 26, 2014

(54) STARTING DEVICE HAVING A THROTTLE PLATE

(75) Inventors: Victor M. Roses, Ann Arbor, MI (US); Ted R. Skrzycke, Clarkston, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 524 days.

(21) Appl. No.: 13/273,849

(22) Filed: Oct. 14, 2011

(65) Prior Publication Data

US 2012/0186242 A1 Jul. 26, 2012

Related U.S. Application Data

(60) Provisional application No. 61/434,589, filed on Jan. 20, 2011.

(51) Int. Cl.
*F16D 33/02* (2006.01)
*F16H 41/26* (2006.01)
*F16H 45/02* (2006.01)

(52) U.S. Cl.
CPC ........ *F16H 45/02* (2013.01); *F16H 2045/0278* (2013.01); *F16H 41/26* (2013.01); *F16H 2045/0205* (2013.01)
USPC .............................................. 60/353; 60/345

(58) Field of Classification Search
USPC ............................ 60/345, 347, 349, 352, 353
See application file for complete search history.

(56) References Cited

U.S. PATENT DOCUMENTS

| 2,377,825 | A | * | 6/1945 | Teagno ............................ 60/353 |
| 3,673,799 | A | * | 7/1972 | Audiffred et al. ................ 60/353 |
| 3,986,356 | A | * | 10/1976 | Frotschner et al. ............. 60/352 |
| RE29,928 | E | * | 3/1979 | Bopp ............................... 60/353 |
| 4,625,512 | A | * | 12/1986 | Morrow, Sr. ..................... 60/353 |
| 7,478,529 | B2 | * | 1/2009 | Menne et al. .................... 60/353 |
| 8,074,449 | B2 | * | 12/2011 | Schips et al. .................... 60/353 |
| 2008/0018525 | A1 | | 1/2008 | Svy et al. |

FOREIGN PATENT DOCUMENTS

JP 2635359 B2 10/1989

* cited by examiner

*Primary Examiner* — Michael Leslie

(57) ABSTRACT

A starting device for a motor vehicle includes a pump connected to a prime mover and a turbine connected to a turbine shaft. The pump and turbine are hydrodynamically connected. A stator assembly is disposed between the pump and the turbine. The stator assembly houses a slidable throttle plate. In a first position, the throttle plate partially blocks a return fluid flow from the stator assembly, thereby effectively reducing the capacity of the starting device. In a second position, the throttle plate does not reduce the capacity of the starting device. The throttle plate position is a function of a balance of forces acting on the throttle plate by a biasing member and a flow of hydraulic fluid contacting the throttle plate.

17 Claims, 2 Drawing Sheets

STARTING DEVICE HAVING A THROTTLE PLATE

CROSS-REFERENCE

Figure 1:
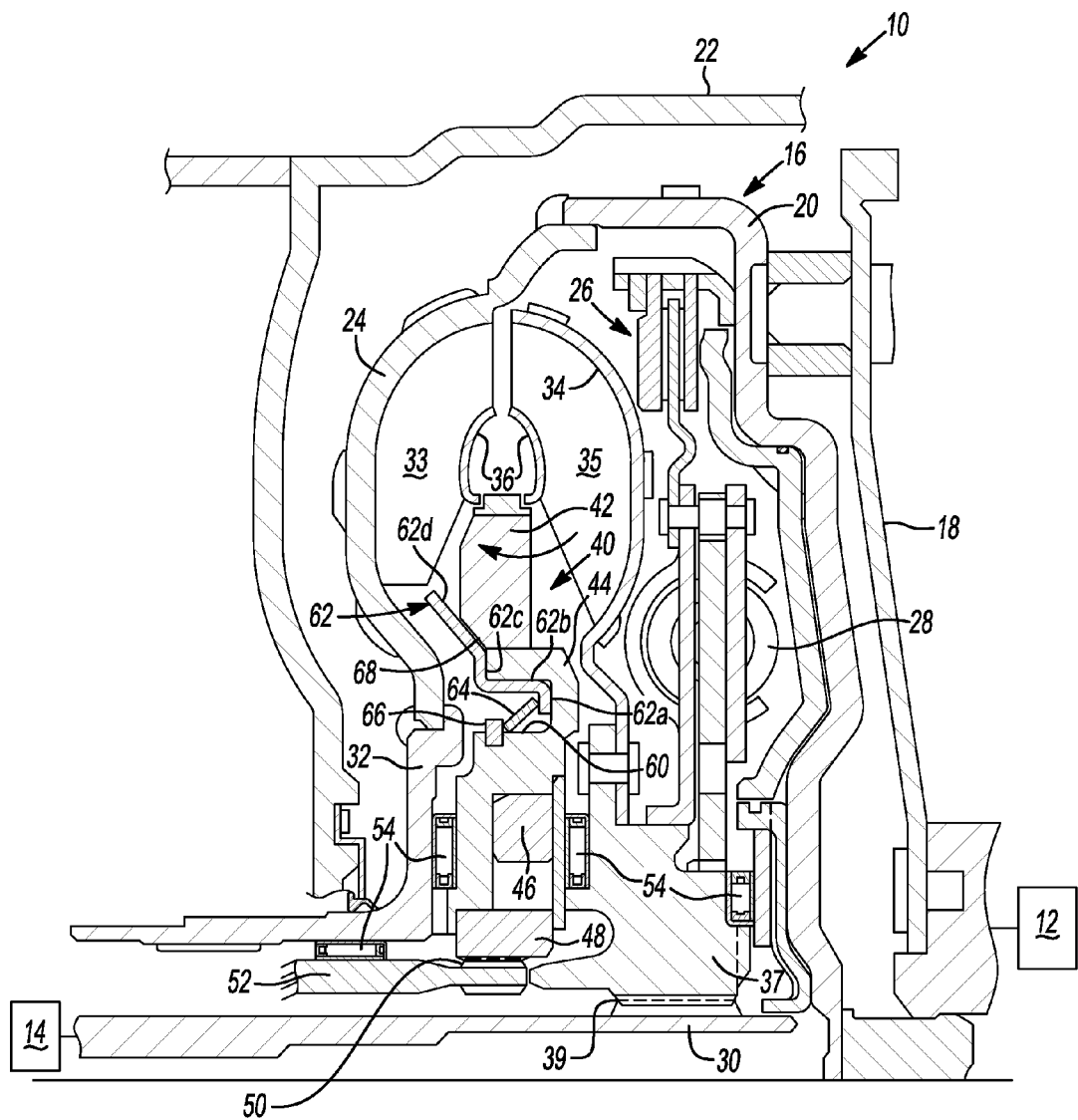

This application claims the benefit of U.S. Provisional Application No. 61/434,589, filed Jan. 20, 2011. The entire contents of the above application are incorporated herein by reference.

FIELD

The present disclosure relates to a starting device for an automatic transmission and more particularly to a hydrodynamic starting device for a transmission having an integrated throttle plate.

BACKGROUND

The statements in this section merely provide background information related to the present disclosure and may or may not constitute prior art.

Hydrodynamic starting devices are often used in motor vehicles in order to improve the performance characteristics of the vehicle. One type of device includes the hydrodynamic launch or starting device. The hydrodynamic launch device is similar to a standard torque converter and generally includes three rotating elements: a pump, a turbine, and a stator. The pump is mechanically driven by a prime mover, such as an internal combustion engine or an electric motor. The turbine is mechanically coupled to a turbine shaft and is driven by fluid flow pumped by rotation of the pump. The stator is interposed between the pump and turbine and alters fluid flow returning from the turbine to the pump in order to multiply torque. In launch devices, the torque multiplication is only used at low gear speeds to improve the launch performance of the motor vehicle. Accordingly, the launch device is typically smaller than a standard torque converter.

While these launch devices are useful for their intended purpose, there is room in the art for a launch device that has efficient packaging, cost, and complexity while improving vehicle fuel efficiency by reducing the load on the engine while the motor vehicle is in idle.

SUMMARY

In one example of the principles of the present invention, a hydrodynamic launch or starting device for a motor vehicle is provided. The starting device is operable to reduce a load on driving prime mover by automatically reducing the capacity of the starting device during low speeds. The starting device includes a pump connected to the prime mover and a turbine connected to a turbine shaft. The pump and turbine are hydrodynamically connected. A stator assembly is disposed between the pump and the turbine. The stator assembly houses a slidable throttle plate. In a first position, the throttle plate partially blocks a return fluid flow from the stator assembly, thereby effectively reducing the capacity of the starting device. In a second position, the throttle plate does not reduce the capacity of the starting device. The throttle plate position is a function of a balance of forces acting on the throttle plate by a biasing member and a flow of hydraulic fluid contacting the throttle plate.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
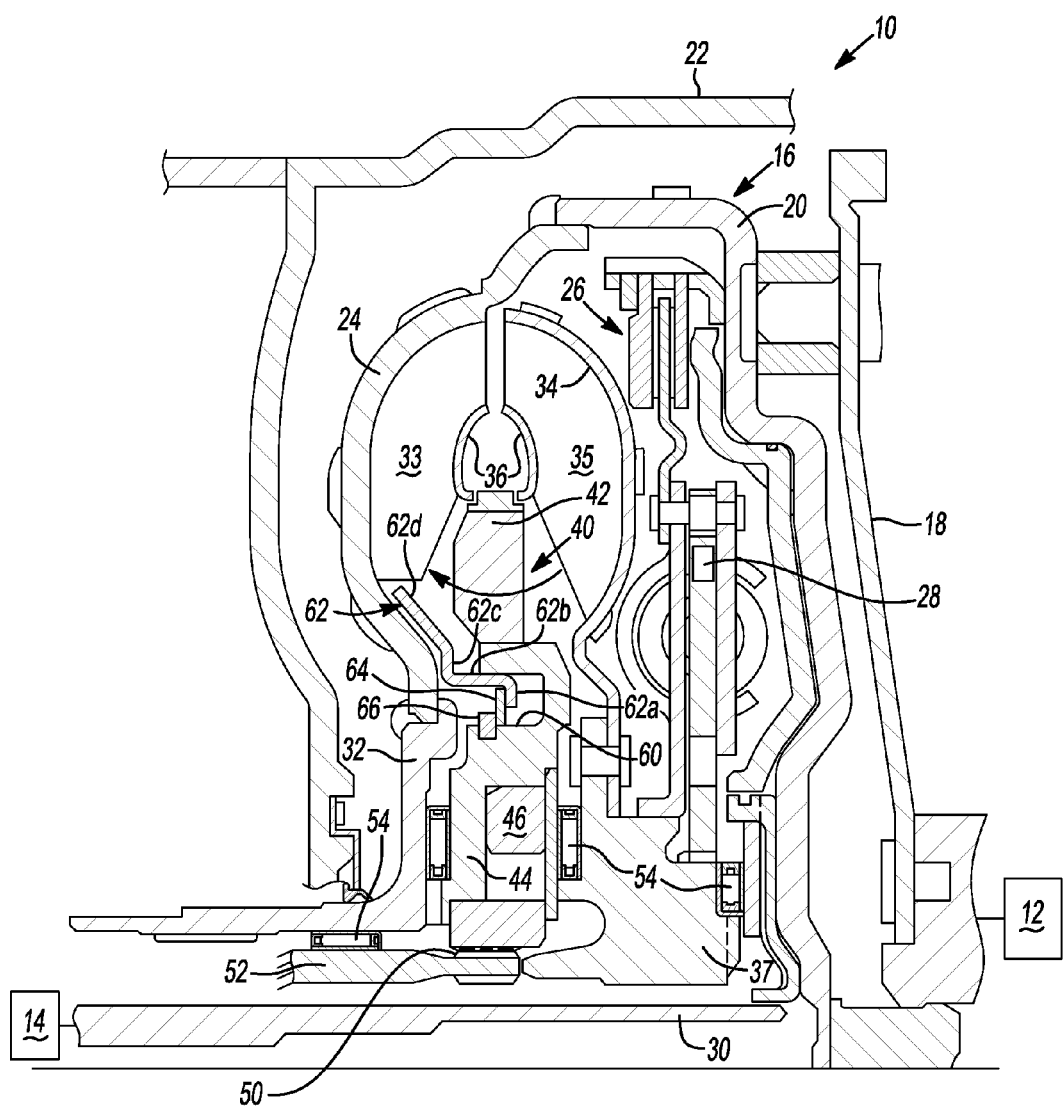

FIG. 1 is cross-section view of a starting device in a powertrain of a motor vehicle in a first mode of operation; and FIG. 2 is cross-section view of the starting device in a powertrain of a motor vehicle in a second mode of operation.

DETAILED DESCRIPTION

The following description is merely exemplary in nature and is not intended to limit the present disclosure, application, or uses.

With reference to FIG. 1, an exemplary powertrain for a motor vehicle is generally indicated by reference number 10. The powertrain 10 includes an engine 12 interconnected to a transmission 14 through a starting device 16. The engine 12 may be a conventional internal combustion engine or an electric engine, or any other type of prime mover, without departing from the scope of the present disclosure. The engine 12 supplies a driving torque to the transmission 14 through a flexplate 18 or other connecting device that is connected to front cover member 20 of the starting device 16.

Generally speaking, the transmission 14 receives driving torque from the starting device 16 and outputs the driving torque to a transmission output shaft (not shown). Disposed between the starting device 16 and the transmission output shaft is a gear and clutch arrangement or gearbox (not shown). The gearbox includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes, and shafts within the transmission 14 may vary without departing from the scope of the present disclosure. In addition, it should be appreciated that the transmission 14 may be a front wheel drive transmission or a rear wheel drive transmission without departing from the scope of the present disclosure. The transmission output shaft (not shown) is preferably connected with a final drive unit (not shown) which may include, for example, propshafts, differential assemblies, and drive axles.

The starting device 16 is housed within a bell housing 22. The bell housing 22 is generally cast aluminum and includes openings, counterbores, flanges, shoulders and other features which receive, locate and support the various components of the starting device 16. The starting device 16 includes the front cover member 20 that is directly driven by the engine 12 via the flexplate connection 18 or other type of connection. The input 20 is located within the bell housing 22 and is connected to a pump 24 and a lock-up clutch 26. The lock-up clutch 26 selectively mechanically connects the input 20 with a flywheel or isolator 28. The flywheel 28 is interconnected (either indirectly, as shown, or directly) to a turbine shaft 30 which is connected with the transmission 14.

The pump 24 is connected with a pump hub 32 that extends into the transmission 14. The pump hub 32 may be connected with a positive displacement pump (not shown) for providing a source of pressurized hydraulic fluid flow. A plurality of impeller blades 33 are connected to and circumferentially spaced around an inside of the pump 24. The pump 24 hydraulically drives a turbine 34 of the starting device 16. A plurality of turbine blades 35 are connected to and circumferentially spaced around an inside of the turbine 34. The impeller blades 33 and the turbine blades 35 have arcuate inner edges that form a split torus ring 36 which reduces fluid turbulence within the starting device 16. The turbine 34 is mechanically connected to a turbine hub 37 which is in turn mechanically connected, for example by a splined connection 39, to the turbine shaft 30.

A stator assembly 40 is disposed within the bell housing 22 and located between the pump 24 and the turbine 34. The stator assembly 40 includes a plurality of circumferentially spaced stator vanes 42 which are connected at their inner end to a stator hub 44. The stator hub 44 has a camming surface mounted about a plurality of rollers 46 which act as a free wheel or one-way clutch to allow the stator vanes 42 to rotate in the same direction as the pump 24 and the turbine 34 during both hydrodynamic operation and lockup clutch operation. The rollers 46 are mounted on a race surface of a stationary stator reaction member 48. It should be appreciated that other suitable types of one-way clutches may be used without departing from the scope of the present disclosure. The stator reaction member 48 is connected, such as by a spline connection 50, to a stationary stator reaction shaft 52.

Annular thrust bearings 54 are disposed between the stator reaction member 44 and the pump hub 32, between the stator reaction member 44 and the turbine hub 37, and between the pump hub 32 and the stator reaction shaft 52. However, it should be appreciated that other bushings, retainer members and the like may be used and are illustrated in FIG. 1 although not specifically described.

The stator hub 44 includes an annular groove 60 located radially inwardly of the stator blades 42. The groove 60 extends axially into the stator hub 44. A throttle plate 62 is slidably disposed within the annular groove 60. The throttle plate 62 includes a first radial portion 62A, an axial portion 62B connected to the first radial portion 62A, a second radial portion 62C connected to the axial portion 62B, and a flange portion 62D connected to the second vertical portion 62C. The portions 62A and 62B are disposed within the annular groove 60. The flange portion 62D is at a non-right angle with respect to the portion 62C and the flange portion 62D extends out away from the stator hub 44 towards the pump 24 and is axially located between the pump 24 and the stator blades 42. The throttle plate 62 is moveable between at least two positions, shown in FIGS. 1 and 2, as will be described in greater detail below. A return spring or other biasing member 64 is located within the groove 60 between a retainer ring 66 and the throttle plate 62. The return spring 64 biases the throttle plate 62 to a first position, shown in FIG. 1. For example, a first end of the return spring 64 contacts the retainer ring 66 and a second end of the return spring 64 contacts the first portion 62A and exerts an axial force on the throttle plate 62 in a direction towards the turbine 34. It should be appreciated that other types of biasing members may be employed. In the first position, the first and second vertical portions 62A and 62C abut the stator hub 44. In the example provided, the stator blades 42 have an angled edge (i.e. a corner cut) 68 that is substantially parallel with the flange portion 62D of the throttle plate 62, thereby allowing the throttle plate 62 to fully abut the stator hub 44 when in the first position without contacting the stator blades 42. In a second position, shown in FIG. 2, the throttle plate 64 is urged against the force of the return spring 64 and slides or translates axially towards the pump 24. In the second position the second vertical portion 62C may abut the inner surface of the pump 24 and the flange portion 62D is disposed substantially parallel to the inner surface of the pump 24.

The operation of the starting device 16 will now be described. Rotation of the flexplate 18 by the engine 12 causes the front cover member 20 to rotate. Since the front cover member 20 is connected to the pump 24, the pump 24 also rotates. The fluid within the starting device 16 is set into motion by the rotation of the pump 24 and impeller blades 33 and kept filled by the fluid pressure from a pump (not shown) driven by the pump hub 32. The impeller blades 33 carry the hydraulic fluid and as the hydraulic fluid is spun around by the impeller blades 33, the hydraulic fluid is thrown outward by centrifugal force and into the turbine blades 35 at an angle. The hydraulic fluid strikes the turbine blades 35, thus imparting torque, or turning effort to the turbine 34 and causing the turbine 34 to rotate. Since the turbine 34 is connected to the turbine hub 54 which is, in turn, connected to the turbine shaft 30, the turbine shaft 30 rotates with the turbine 34. The hydrodynamic coupling between the pump 24 and the turbine 34 may be bypassed by engaging or applying the lock-up clutch 26 such that the cover member 20 is directly connected to the turbine hub 44 through the flywheel 28, thereby rotating the turbine shaft 30.

When the engine 12 is operating at low speeds such as during an idle condition, the force of the rotating hydraulic fluid on the flange portion 62D of the throttle plate 62 returning from the turbine 34 and the stator assembly 40 is insufficient to overcome the force exerted on the throttle plate 62 by the return spring 64. Accordingly, at engine idle speeds, the throttle plate 64 is in the first position, thereby partially blocking the flow of hydraulic fluid from the stator assembly 40. This in turn effectively reduces the capacity of the starting device 16 and therefore the load on the engine 12. This can result in a fuel efficiency gain of approximately 0.05 to 0.07 miles per gallon with a 2.5 Nm load reduction based on 800 rpm engine idle speed.

At higher engine speeds, such as during motor vehicle launch, the force on the flange portion 62D of the throttle plate 62 returning from the rotating hydraulic fluid returning from the turbine 34 and the stator assembly 40 is sufficient to overcome the force exerted on the throttle plate 62 by the return spring 64. Accordingly, at higher engine speeds, the throttle plate 64 moved to the second position. Since the flange portion 62D has an angle or contour similar to that of the pump 24, the throttle plate 62 does not block the flow of hydraulic fluid from the stator assembly 40. Therefore, the capacity of the starting device 16 is not reduced during higher engine speeds 12. During coasting at higher engine speeds, the lock-up clutch 26 is applied to bypass the pump 24 and turbine 34 to avoid the throttle plate 62 from moving to the first position. Finally, the throttle plate 62 can be used with negative retention stator blade tuning to maximize the idle loss reduction.

The description of the invention is merely exemplary in nature and variations that do not depart from the gist of the invention are intended to be within the scope of the invention. Such variations are not to be regarded as a departure from the spirit and scope of the invention.

The following is claimed:

1. A launch device connected between an engine and a transmission in a motor vehicle, the launch device comprising:
   a pump driven by the engine, the pump having a plurality of impeller blades connected to and circumferentially spaced around an inside surface of the pump;
   a turbine connected to the transmission, the turbine having a plurality of turbine blades connected to and circumferentially spaced around an inside surface of the turbine;
   a fluid disposed between the pump and the turbine for hydrodynamically connecting the pump to the turbine; and
   a stator assembly disposed between the pump and the turbine, the stator assembly having a plurality of circumferentially spaced stator vanes connected to a stator hub and having a throttle plate slidably connected to the stator hub, wherein the throttle plate is moveable between a first position and a second position, wherein the throttle plate partially blocks a flow of the fluid through the stator vanes when the throttle plate is in the first position and the throttle plate does not block a flow of the fluid through the stator vanes when the throttle plate is in the second position.

2. The launch device of claim 1 wherein the throttle plate is disposed axially between the stator hub and the pump.

3. The launch device of claim 1 wherein the throttle plate includes a radially extended flange and the radially extended flange is closer to the stator hub than the pump when in the first position and wherein radially extended flange is closer to the pump than the stator hub when in the second position.

4. The launch device of claim 3 wherein the radially extended flange has a contour that substantially matches a contour of a portion of the inner surface of the pump.

5. The launch device of claim 1 wherein the throttle plate includes an axially extended annular portion and an axially and radially extended annular portion, and wherein the axially extended annular portion is slidably connected with the stator hub and wherein the axially and radially extended annular portion is disposed radially outwardly of the stator hub.

6. The launch device of claim 5 wherein the stator hub includes an annular groove disposed radially inwardly of the stator vanes and wherein the axially extended annular portion of the throttle plate is slidably disposed within the annular groove.

7. The launch device of claim 6 further comprising a biasing member disposed between the axially extended annular portion of the throttle plate and the stator hub for biasing the throttle plate towards the first position.

8. The launch device of claim 7 wherein the throttle plate moves from the first position to the second position when a force of a flow of the fluid acting on the axially and radially extended annular portion of the throttle plate exceeds a force of the biasing member acting on the axially extended annular portion of the throttle plate.

9. The launch device of claim 1 wherein the stator hub has a cam surface mounted about a plurality of rollers which act as a free wheel or one-way clutch to allow the stator vanes to rotate in the same direction as the pump and the turbine and wherein the plurality of rollers are mounted on a race surface of a stationary stator reaction member.

10. A launch device connected between an engine and a transmission in a motor vehicle, the launch device comprising:
   a pump driven by the engine, the pump having a plurality of impeller blades connected to and circumferentially spaced around an inside surface of the pump;
   a turbine connected to the transmission, the turbine having a plurality of turbine blades connected to and circumferentially spaced around an inside surface of the turbine;
   a fluid disposed between the pump and the turbine for hydrodynamically connecting the pump to the turbine; and
   a stator assembly disposed between the pump and the turbine, the stator assembly having a plurality of circumferentially spaced stator vanes connected to a stator hub and having an annular plate supported by the stator hub, wherein the annular plate is moveable along an axis, and wherein the position of the annular plate along the axis is a function of a balance of forces acting on the annular plate by a biasing member and a flow of the fluid contacting the annular plate.

11. The launch device of claim 10 wherein the annular plate is disposed axially between the stator hub and the pump.

12. The launch device of claim 10 wherein the annular plate includes a radially extended flange having a distal end disposed radially inward of the plurality of pump blades.

13. The launch device of claim 10 wherein the annular plate includes a flange portion that extends axially and radially away from the stator hub and a base portion, and wherein the base portion is slidably connected with the stator hub.

14. The launch device of claim 13 wherein the stator hub includes an annular groove disposed radially inwardly of the stator vanes and wherein the base portion of the annular plate is slidably disposed within the annular groove.

15. The launch device of claim 14 wherein the stator hub is coupled to a one way clutch that allows the stator vanes to rotate in the same direction as the pump blades and the turbine blades.

16. The launch device of claim 14 wherein the plurality of stator blades each have an angled edge that is substantially parallel with the flange portion of the annular plate.

17. A launch device for a powertrain in a motor vehicle, the launch device comprising:
   a pump having a plurality of impeller blades connected to and circumferentially spaced around an inside surface of the pump;
   a turbine having a plurality of turbine blades connected to and circumferentially spaced around an inside surface of the turbine;
   a fluid disposed between the pump and the turbine for hydrodynamically connecting the pump to the turbine; and
   a stator assembly disposed between the pump and the turbine, the stator assembly having a plurality of circumferentially spaced stator vanes connected to a stator hub and having a throttle plate slidably connected to the stator hub and disposed axially between the stator hub and the pump, wherein the throttle plate is moveable between a first position and a second position, and wherein the throttle plate includes a radially extended flange and the radially extended flange is closer to the stator hub than the pump when in the first position and wherein radially extended flange is closer to the pump than the stator hub when in the second position.

* * * * *